US006231656B1

(12) United States Patent
Dekerf et al.

(10) Patent No.: US 6,231,656 B1
(45) Date of Patent: May 15, 2001

(54) RELEASE AGENTS FOR USE IN LIGNOCELLULOSIC PROCESSES AND PROCESS FOR PREPARING MOLDED LIGNOCELLULOSIC COMPOSITES

(75) Inventors: Marc Dekerf, Dworp (BE); Manfred K. Seven, Morris County, NJ (US); Dirk Danneels, Boortmeerbeek (BE)

(73) Assignee: Allied Signal Inc., Morristown, NJ (US)

( * ) Notice: Subject to any disclaimer, the term of this patent is extended or adjusted under 35 U.S.C. 154(b) by 0 days.

(21) Appl. No.: 09/252,524

(22) Filed: Feb. 18, 1999

(51) Int. Cl.[7] ................... C09D 191/06; C09D 191/08
(52) U.S. Cl. ................... 106/38.25; 106/270; 106/271; 264/109; 264/300
(58) Field of Search .................. 106/38.25, 270, 106/271; 264/109, 300

(56) References Cited

U.S. PATENT DOCUMENTS

| 2,879,239 | 3/1959 | De Groote . | |
|---|---|---|---|
| 3,994,737 | * 11/1976 | Bienvenu | 106/31 |
| 4,378,998 | 4/1983 | Korbanka et al. . | |
| 4,632,955 | 12/1986 | Cook . | |
| 4,990,184 | * 2/1991 | Dotson et al. | 106/14.11 |
| 5,750,269 | * 5/1998 | Park | 428/484 |
| 5,908,496 | * 6/1999 | Singule et al. | 106/271 |

FOREIGN PATENT DOCUMENTS

| 2035706 | 1/1972 | (DE) . |
| 4224990 | 2/1994 | (DE) . |
| 1050548 | 12/1966 | (GB) . |
| 92/11331 | 7/1992 | (WO) . |
| 97/41158 | 11/1997 | (WO) . |
| WO/98/00464 | 1/1998 | (WO) . |

OTHER PUBLICATIONS

Database WPI Section Ch, Week 198720 Derwent Pubications Ltd., London, GB, AN 1987–140011, XP002138619 & JP 62 079267 A (Nippon Seiro KK), Apr. 11, 1987 abstract.
Patent Abstracts of Japan, vol. 015, No. 403 (c–0875), Oct. 15, 1991 & JP 03 167204 A (Mitsui Petrochem Ind. Ltd.), Jul. 19, 1991 abstract.

* cited by examiner

Primary Examiner—David Brunsman
(74) Attorney, Agent, or Firm—Colleen D. Szuch

(57) ABSTRACT

The invention provides improved release agents used in processes for preparing molded lignocellulosic articles. The release agents are preferably applied as an emulsion in processes for preparing molded articles such as oriented strand board, waferboard or plywood. The release agents contain a co-oxidized blend of a first wax and a second wax, wherein the first wax has a Brookfield viscosity which is at least about 150 mPas at 140° C. and the second wax has a Brookfield viscosity which is less than about 100 mPas at 140° C.

17 Claims, No Drawings

RELEASE AGENTS FOR USE IN LIGNOCELLULOSIC PROCESSES AND PROCESS FOR PREPARING MOLDED LIGNOCELLULOSIC COMPOSITES

BACKGROUND OF THE INVENTION

The present invention relates to improved release agents used in processes for preparing molded articles. More particularly, the invention relates to externally-applied wax-based release agents which are used in processes for preparing molded articles such as oriented strand board, waferboard or plywood.

An advantage of the release agents of the present invention is that they possess a unique combination of viscosity, crystallinity and hardness properties which heretofore were not believed to be attainable in single component wax-based released agents.

It is known in the art that molded lignocellulosic or wood-based products can be prepared using standard batch procedures or, more recently, using continuous techniques. The preparation of wood composites typically includes introducing an aqueous composite mixture of wood chips or the like between two heated metal plates which press and shape the composite mixture under pressure. Furthermore, the use of wax release agents in processes for the binding of lignocellulosic materials with polyisocyanates has also been previously described. See, for example, WO 98/00464, the contents of which are incorporated herein by reference.

In a typical process, an organic isocyanate binder such as a polyisocyanate, which is usually in the form of a solution or an aqueous emulsion, is applied to a lignocellulosic material which is then subjected to heat and pressure. The quality of the resulting articles, e.g. sheets or molded bodies such as chipboard or plywood, is largely due the adhesive properties of the organic polyisocyanates. Unfortunately, these adhesive polyisocyanates are the cause of significant problems during the molding process. For example, isocyanates often cause severe sticking of the lignocellulosic material to the hot metal press plate surfaces it is in contact with during the hot-pressing operation. Consequently, the molded product is often harmed as a result of trying to remove it from the press plates. Another problem associated with polyisocyanates is that the time required for cleaning the contaminated hot metal surfaces can be substantial. Thus, in spite of the usefulness of polyisocyanates as adhesive binders, they are associated with drawbacks which can be costly.

Alternative adhesive or binder products such as urea formaldehydes, phenol formaldehydes and phenolic impregnated papers have been used as replacements for polyisocyanates. Such alternative binders, however, have not met with success for various reasons. For example, the moisture resistance associated with the formaldehydes is less than that which is desirable. Furthermore, these products are associated with certain health risks. Interest has therefore been focused on developing "release agents", that is, additives specifically intended to favor the release of the manufactured articles from the metal plates of the press and overcome other processing difficulties associated with polyisocyanates.

Often release agents are combined with the polyisocyanates as part of the binding emulsion. Such agents are typically referred to as internal release agents. Alternatively, external release agents which are usually applied to the press surfaces which come into contact with the lignocellulosic composite mixture have been suggested. For example, conventional release agents such as oils, wax polishes, metallic soaps, silicones and polytetrafluoroethylene have been applied externally on the metal surfaces but have proved unsatisfactory.

The shortcomings associated with currently available release agents which can be used with isocyanates are particularly evident in the context of commercial scale, continuous or semi-continuous molding operations. The press equipment is used repeatedly in short cycle times. If one wishes to rapidly produce articles having uniform quality, the problems associated with adhesion to the press parts must be essentially eliminated. Furthermore, the time required for cleaning the press parts surfaces to remove resinuous material formed on the hot surfaces of the press parts due to thermal decomposition must be reduced to a minimum.

It has thus been determined that there is a continued need for improvements in release agents. Specifically, there is a need to provide release agents which have a desirable combination of several physical attributes, such as viscosity and hardness, to overcome the shortcomings associated with isocyanate-based binding systems. For example, some external release agents such as emulsions of A-C® 6702 wax, a product of AlliedSignal, Morristown, N.J., have good release properties and do not cause a build up on the forming belts. These emulsions, however, may leave a sticky residue on many of the surfaces surrounding the spinning disk equipment which applies the emulsion to the platen and cause clogging. Emulsions of A-C® 659 wax, another AlliedSignal product, on the other hand do not leave a residue near the spinning disk equipment. The dried emulsion is deposited as small, white particles that are easily removed with compressed air. Continuous use of these release agent emulsions, however, leads to a considerable build up of wax and rosin on the forming belts, a problem often referred to as a plate-out. In sum, currently available release agents have some desirable properties and some undesirable properties. Some have sufficient hardness to form depositions around the spinning disk equipment which are easily removable, but the viscosity of these agents is too high to be absorbed by the wood. Conversely, if the release agent has a viscosity which is low enough to be absorbed by the wood, and thereby solve the problem of plating-out, it is so soft that it leaves sticky deposits in the areas surrounding the spinning disks.

It has now been found that by co-oxidizing blends of certain types of wax and wax-like release agents, the resultant products have a synergistic combination of physical attributes which are especially well-suited for use in externally-applied release agent emulsions.

DESCRIPTION OF THE INVENTION

The invention provides a wax-based release agent comprising a co-oxidized blend of a first wax having a Brookfield viscosity which is at least about 150 mPas at 140° C. and a second wax having a Brookfield viscosity which is less than about 100 mPas at 140° C. In some preferred embodiments, the first wax has a Brookfield viscosity which is in the range of 150 mPas to 1,000 mPas at 140° C. and the second wax has a Brookfield viscosity which is less than about 60 mPas at 140° C. In more preferred embodiments, the first wax has a Brookfield viscosity which is in the range of from about 180 mPas to about 400 mPas at 140° C. and the second wax has a Brookfield viscosity which is from about 20 mPas to about 50 mPas at 140° C.

The invention also provides a method of preparing molded composite materials in a press plate-containing molding apparatus. The method includes a) treating the surfaces of the press plates which contact a composite mixture with an effective amount of a wax-based release agent described above, i.e. a co-oxidized blend of a first wax which has a Brookfield viscosity which is at least about 150 mPas at 140° C. and a second wax which has a Brookfield viscosity which is less than about 100 mPas at 140° C., prior to the composite mixture contacting the press plate surface, and b) applying the release agent treated press plate surfaces to the composite mixture under conditions sufficient to mold the composite.

The invention also provides a method of preparing a wax based release agent. In this aspect of the invention, the method includes blending a first wax having a Brookfield viscosity which is at least about 150 mPas at 140° C. and a second wax having a Brookfield viscosity which is less than about 100 mPas at 140° C., and thereafter co-oxidizing the blend. The method also optionally includes emulsifying the co-oxidized release agent with a suitable emulsifying agent.

The invention still further provides a wax-based release agent and emulsion containing the same prepared by the above-mentioned process.

In accordance with one aspect of the invention the co-oxidized wax-based release agents have specific and controlled viscosity, hardness, crystallinity and melting point ranges as well as easy emulsifiability. The combination of these properties substantially reduce and/or overcome the problems associated with polyisocyanate binders.

The co-oxidized blend comprises from about 20 to about 80 wt % of the first wax and from about 80 to about 20 wt % of the second wax. More preferably, the blend of waxes is from about 30 to about 70 wt % of the first wax and from about 70 to about 30 wt % of the second wax. In especially preferred aspects, the co-oxidized release agent is formed from blends which comprise about 50 wt % of each wax.

In alternative embodiments, the co-oxidized blend is prepared with more than two waxes. In these aspects of the invention, the artisan can include one or more additional waxes in the blend prior to the co-oxidizing step in order to obtain additional release properties. The supplemental wax (es) can be included in amounts of up to about 50% or more, if desired.

The viscosity of the co-oxidized wax blends of the present invention ranges from about 5 to about 100 cps at 140° C. In preferred aspects, the viscosity of the co-oxidized blend is from about 20 to about 60 cps at 140° C. The hardness of the inventive co-oxidized wax product ranges from about 0.1 to about 100 dmm at 25° C. Preferably, however, the co-oxidized blend of waxes has a hardness of from about 0.1 to about 10 dmm. at 25° C. The drop point of the wax-based release agent is from about 80 to about 120° C. and preferably from about 105 to about 115° C.

The co-oxidized waxes of the invention may have acid numbers from about 5 to about 50 mg KOH/g. The preferred range is from about 5 to about 18. In general, although lower acid number products may be used, e.g. less than about 5, they often require higher amounts of surfactant for satisfactory emulsifiability. In some cases, this increases the cost and excessive surfactant can be detrimental to performance in the final release agent formulation.

Oxidation of individual waxes is known in the art as a suitable way to render the waxes dispersible in an aqueous medium to form an aqueous emulsion. In a typical process, the wax is placed in a suitable reactor vessel such as a pressure autoclave and subjected to sufficient heat and pressure while being sparged with air or oxygen. In the case of the release agents of the present invention, the individual components are commingled or otherwise combined, preferably by melt blending, and thereafter the blend of the ingredients is co-oxidized in a manner such as that disclosed above. Preferably, however, the co-oxidizing is carried out under relatively mild temperatures of from about 120 to about 160° C.

Oxidation procedures, such as that described below in Example 1, can be used to prepare a variety of co-oxidized products. Those of ordinary skill will realize that the process parameters can be varied somewhat without materially affecting the results. Consequently, the parameters used in the example should be understood as being suitable for the particular ingredients used and not limiting in scope as to temperature, pressure and airflow variations when other feedstocks are used. Both air, air enriched with oxygen, pure oxygen and combinations of air, oxygen and ozone may be advantageously used to prepare the co-oxidized products.

To accelerate the oxidation, catalysts may be used, generally at concentrations from as low as about 0.01% to as much as 5% by weight. Suitable catalysts are previously oxidized polyethylenes, peroxides, long chain carboxylic acids and metal salts of various types. Some hydrocarbon waxes are difficult to oxidize and catalysts may be preferred to obtain suitable rates of oxidation.

It is important to highlight that different hydrocarbons (including PE) fundamentally oxidize at different rates. Wax blends that are co-oxidized together (as per the invention) basically retain their individual rates of oxidation in spite of being physically admixed prior to the co-oxidation reaction. For example, under the same reaction conditions, amorphous waxes will oxidize faster and to a greater extent than highly crystallized waxes will. Notwithstanding the foregoing, it has been found that a wax product that has been made by direct co-oxidation of two or more waxes is fundamentally different than a mere blend of individually oxidized waxes or emulsion of two or more separately oxidized waxes.

For purposes of the present invention "co-oxidized" means the product produced by substantially simultaneous oxidation of at least two waxes. This is to be contrasted with feedstock combinations that are co-emulsified. Co-oxidation of two or more products prior to emulsification has several advantages, including: simplicity and lower overall cost, emulsion stability (one product vs. two or more), as well as improved product quality and consistency.

It is preferred to combine raw material feedstocks that exhibit the following combination properties:

1. Heat stability in air-up to 200° C.
2. Good metal release properties—nonsticking, nonfouling characteristics.
3. Non-crystallizing with formation of powdery surfaces.
4. Good interface lubricity.
5. Non-reactive with the substrates, i.e. wood and isocyanate binder.

In general, however, the co-oxidizing of the blended ingredients results in a final product which has a combination of properties which are not characteristic of all physical attributes of either of the principal ingredients.

A skilled artisan will appreciate that there are many waxes which meet the viscosity limitations of Applicants' invention. A representative, non-limiting list of waxes which are relatively high in viscosity and thus suitable as "first" waxes is provided below.

| RELATIVELY HIGHER VISCOSITY WAXES | |
|---|---|
| GRADE | APPROX. BROOKFIELD VISCOSITY |
| ALLIED A-C 9 | 450 |
| ALLIED A-C 617 | 180 |
| ALLIED A-C 6 | 375 |
| ALLIED A-C 8 | 450 |
| EASTMAN N-14 | >150 |
| HOECHST PE 520 | 650 |
| HOECHST PE 130 | 300 |
| LION CHEMICAL LC 103 N | 300 |
| BASF A wax: | 600 mPas |
| BASF AH 6 wax: | 600 mPas> |
| Eastman N10: | >200 mPas |
| Huls A 235: | >150 mPas |
| Mitsui 320 mp: | 250 mPas |
| Mitsui 405 MP: | 650 mPas |
| Mitsui 400 P: | 650 mPas |

One preferred "first" wax is A-C 617, a product of AlliedSignal, Inc., Morristown, N.J. A representative, non-limiting list of waxes which are relatively lower in viscosity than the "first" wax and thus suitable as "second" waxes include those shown in the table below:

| RELATIVELY LOWER VISCOSITY WAXES | |
|---|---|
| GRADE | APPROX. BROOKFIELD VISCOSITY |
| ALLIED A-C 1702 | 30 |
| MITSUI 220P | 80 |
| MITSUI 110P | 20 |
| SASOL H1 | <10 |
| BARBCO POLYWAX 500–2000 | <50 |
| BASF AL 3 | 90 |
| Marcus Waxes | 20–60 |
| Paraffin waxes | <50 |
| Huls A415: | <100 mPas |
| Mitsui 210 MP: | 80 mPas |
| Mitsui 220 MP: | 80 mPas |
| Mitsui 200 P: | 80 mPas |
| Mitsui 100 P: | 15 mPas |

One preferred "second" wax is Marcus 300, available from Marcus Wax Inc.

In addition to the above-mentioned "first" and "second" waxes, the artisan may select waxes from among other known waxes, provided the above mentioned viscosity limitations are met. Other suitable waxes include polyolefine-based waxes, low density and high density polyethylene waxes, preferably of low viscosity, polypropylene-based waxes both mildly oxidized and grafted with unsaturated acids as well as their metal base derivatives, Fischer-Tropsch waxes, hydrocarbobn waxes such as paraffins and microcrystalline waxes, fatty acid derivatives of waxy consistency such as free long chain fatty acids, metallic soaps, amides and esters. Oxidized polyethylenes are preferred.

The release agent may also include other ingredients, including for example, natural waxes such as fatty acide derivatives of waxy consistency such as free long chain fatty acids, metallic soaps, amides and esters. Such products can be combined by emulsification or by high shear dispersion to form suitable agents for the processing of wood fiber chipboard. Additional dispersing agents or surfactants may be used to optimize the emulsification or dispersion processes as well as enhance processability.

In another embodiment, there are provided aqueous emulsions of the co-oxidized wax blend release agents. The aqueous emulsion of the co-oxidized release agent according to the present invention can be made by any method known to those skilled in the art, such as by high shear mixing. Preferably, the emulsion is made using a direct pressure method which can include the steps of: charging all ingredients into a stirred pressure vessel; closing the vessel, agitating and heating the ingredients to about 120–125° C.; maintaining the temperature for a time sufficient to allow an emulsion to from, e.g. about 15 minutes for usual-sized batches; and cooling the batch as quickly as possible to about room temperature (25–30° C.) which will result in a clear emulsion forming.

The emulsions can be diluted with distilled or demineralized water from about 30% solids down to about 1% solids, if desired.

In many aspects of the invention, the emulsion will preferably further comprise an emulsifier. Suitable emulsifiers used can either be anionic, non-ionic or cationic. See, for example, the emulsifiers found in the aforementioned WO 98/00464 which was previous incorporated herein by reference. The emulsifiers are generally used in an amount of about 1 to about 10 and preferably about 4 to about 7 wt % of the total emulsion. One preferred emulsifier is Marlipal 013.90, an ethoxylated fatty alcohol with 9 moles of ethoxylation.

Examples of suitable anionic emulsifiers include carboxylates, sulphates, sulphonates and phosphates, such as alkylbenzene derivatives; alkyl ether carboxylic acids and salts, e.g., sodium alkyl ether carboxylates; alkyl sulphosuccinates, e.g., all-sodium monoalkylsulphosuccinate, sodium di-alkyl sulphosuccinates and disodium monoalkyl ethoxy sulphosuccinates; alpha olefin sulphonates; aromatic hydrocarbon sulphonic acids, e.g., benzene sulphonic acid blends, cumene sulphonic acid, phenol sulphonic acid, toluene sulphonic acid and xylene sulphonic acid; aromatic hydrocarbon sulfonate salts, e.g., ammonium xylene sulfonate, dihydroxyl diphenyl sulphones, naphthalene sulphonates and sodium toluene sulphonates; fatty alcohol ethoxy sulphates, e.g., ammonium lauryl ethoxy sulphates and triethanolamine lauryl ethoxy sulphate; fatty alcohol sulphates, e.g., ammonium lauryl sulphates, monoethanolamine lauryl sulphate and sodium alkyl sulphates; and phosphate esters, e.g., alkyl phenol ethoxy phosphate ester and fatty alcohol phosphate eater.

The aqueous emulsion of the polyolefin wax useful in the present process should contain a sufficient amount of the co-oxidixed wax-based release agent to provide a coverage of about 0.1 to about 0.9 and preferably about 0.2 to about 0.5 milligrams of the co-oxidized release agent per square cm of the lignocellulosic material. When taking the emulsifiers into account, the aqueous emulsions used in the present invention will contain about 1 to about 40%, preferably about 3 to about 30% and more preferably about 5 to about 25% by weight of total solids.

In general, it has been found that emulsions containing the wax-based release agents of the present invention can be applied to the lignocellulosic material and/or press plate surfaces as a spray or liquid coating in an amount of from about 2 to about 35 and preferably about 8 to about 16 and most preferably about 10 milligram/square cm. However, it is understood that the amount of application can be varied as needed for a particular purpose.

The aqueous emulsions of the present invention may also contain other additives known to those of ordinary skill, such as anti-foam agents such as Lefasol 472 in amounts ranging from about 0.2 to about 1% by weight of the total emulsion, biocides such as Mergal K14, ranging from about 0.2 to about 0.4% by weight of the total emulsion, flame retardants, lignocellulosic preserving agents, fungicides, waxes, sizing agents, fillers, surfactant, other binders and catalysts in amounts which are standard in the industry when so included.

Using a co-oxidized wax based release agent emulsion as described above in a process for binding lignocellulosic material with polyisocyanates provides improved release and shortened downtime for cleaning when compared to the conventional processes. Board properties are not detrimentally influenced. These wax-based release agents in emulsions are effective over a wide temperature range. Thus, higher press temperatures can be used (up to 235° C.) which speed up the cure process.

In another aspect of the invention, there is provided a method of preparing molded articles such as oriented strand boards, fiber boards, wafer boards and the like. Suitable lignocellulosic-containing raw materials which may be used in the processes of the present invention include all types known in the industry, such as wood strands, wood chips, wood fibers, shavings, veneers, wood wool, cork, tree bark, sawdust and similar waste products of the woodworking industry as well as other materials having a lignocellulosic basis such as paper, bagasse, straw, flax, sisal fibers and coconut fibers, hemp, rushes, reeds, rice hulls, husks, grass, nutshells, bamboo, alfalfa grass and the like. Moreover, the lignocellulosic material may be mixed with other particulate or fibrous materials such as mineral fillers, glass fiber, mica, rubber, textile waste such as plastic fibers and fabrics. These raw materials may be in the form of granules, chips, fibers or powders and may have a water content of from 0 to 35 wt. % (preferably from 5 to 25 wt. %). The composite mixture will also contain a binder such as a polyisocyanate, described in more detail below, and molded generally with the application of heat and pressure to form boards or shaped products. Molded products may, of course, also be produced in accordance with the present invention from other organic (e.g. plastic waste of all kinds) and/or inorganic raw materials (e.g. expanded mica or silicate pellets).

The organic polyisocyanates which are useful as lignocellulosic binders in the present invention include any organic polyisocyanate compound or mixture of organic polyisocyanate compounds which are known to those of ordinary skill. A non-limiting representative list of polyisocyanates includes diisocyanates, particularly aromatic diisocyanates, and isocyanates of higher functionality; aliphatic isocyanates such as hexamethylene diisocyanate; aromatic isocyanates, such as m and p-phenylene diisocyanate, tolylene-2,4- and -2,6-diisocyanate, diphenylmethane-4,4'-diisocyanate, chlorophenylene-2,4-diisocyanate, naphthylene-1,5-diisocyanateldiphenylene 4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanato toluene and 2,4,4-triisocyanatodiphenylether.

Modified polyisocyanates containing isocyanurate, carbodiimide or uretonimine groups may also be used according to the present invention. Furthermore, blocked polyisocyanates, such as the reaction product of a phenol or an oxide and a polyisocyanate, having a deblocking temperature below the temperature applied when using the polyisocyanate composition may be utilized as the organic polyisocyanate binder. Mixtures of the foregoing are also contemplated.

The organic polyisocyanate binder is generally applied to the lignocellulosic material in an amount of about 0.1 to about 25% weight, preferably about 1 to about 10 and most preferably about 2 to about 6% by weight based upon the dry weight of the lignocellulosic material.

The boards or molded articles based on lignocellulose-containing other organic and/or inorganic raw materials produced in accordance with the present invention are particularly suitable for use in the building industry because of their excellent mechanical properties. In order to impart to these boards or molded articles the necessary resistance to mold, insects, or fire, the usual commercial additives (such as organic or inorganic protective agents) may be added to the binders or raw materials, either neat or as solutions. These additives are generally used in a quantity of about 0.05 to 30 wt. %, preferably 0.5 to 20 wt. %, based on the entire quantity of composite. Solvents which may be used in the present invention include water and organic solvents such as residual oils from the petroleum industry, chlorinated hydrocarbons, etc. These solvents generally do not impair adhesive quality. In contrast to boards glued with phenol/formaldehyde resin, the materials produced in accordance with the present invention have the advantage that neither efflorescence of salt nor "bleeding" occurs.

According to the process of the present invention, the lignocellulosic material is brought into contact with the organic polyisocyanate binder material by means of mixing, blending, spraying and/or spreading the polyisocyanate composition with or onto the lignocellulosic material. Such application may generally take place in a conventional blender. Thereafter, the treated lignocellulosic material is formed into a mat, preferably upon a screen. The treated lignocellulosic material is then conveyed to a press where pressure is applied thereto at elevated temperatures. The pressing operation generally consists of pressing at 120° C. to 260° C. at pressures of about 2 to 6 MPa. Such binding processes are commonly known in the art. However, it will be recognized by those in the art that the pressing operation may be modified as needed for a particular operation. One particularly preferred continuous press is available from Siempelkamp and is used in continuous oriented strand board (OSB) processes.

According to one preferred embodiment, the emulsion containing the co-oxidized waxes is used as an external release agent. The emulsion is then preferably applied to the surface of the mat of polyisocyanate treated lignocellulosic material. It will be understood by those of ordinary skill that it may be helpful, but not essential, to condition or "prime" the caul plates of the pressing equipment at the start of a manufacturing run by spraying their surfaces with the emulsion of the present invention or any other conventional external release agent. A preconditioned press may then be used many times without further treatment. Alternatively, boards can be pressed continuously between endless steel belts which are coated with the inventive emulsion in presses having the temperature and pressure requirements discussed above.

While the release agents of the present invention are particularly suitable for the manufacture of oriented strand board (OSB), they are not limited in this regard. The release agents can also be used in the manufacture of various types of composite structures, such as medium density fiberboard, particle board (also known as chipboard) and plywood. Furthermore, the co-oxidized wax blends of the present invention can also be used as internal release agents, if desired without undue experimentation. For example, referring again to the aforementioned WO 98/00464, the artisan using standard techniques, can replace the PCT publication's disclosed singular oxidized wax in an emulsion with a co-oxidized wax. In such situations, the polyolefin wax emulsion can be pre-mixed with a suitable polyisocyanate binder and applied to a lignocellulosic material as one stream. This route is advisable when the polyisocyanate is used as an aqueous emulsion or suspension. Alternatively, the co-oxidized wax emulsion and the polyisocyanate binder are applied, preferably simultaneously, to the lignocellulosic material as two separate streams. When used as internal release agent, the weight ratio of the co-oxidized wax emulsion/polyisocyanate composition is in the range of from about 1:10 to about 3:1 and preferably about 1:1.

The following non-limiting examples serve to illustrate the invention. It will be appreciated that variations in proportions and alternatives in elements of the components of the release agents will be apparent to those skilled in the art and are within the scope of the present invention.

EXAMPLE 1

Co-Oxidation of Waxes

About equal weights (parts) of A-C® 617 and A-C 1702, products of AlliedSignal, Morristown, N.J., were charged to a pressure autoclave reactor equipped with mechanical agitation, an internal coil for cooling and an external jacket for heating. The charge was heated until the temperature reached 150° C. and then agitation was commenced to thoroughly blend the previously charged waxes.

A sample was then drawn from the reactor to determine the initial properties of the blend and to assure that the two waxes were homogeneously blended.

While the temperature was maintained at 150° C., air at a rate of 0.8–1.2 standard liters per minute per kg charged was admitted to the reactor via a sparge tube that was immersed below the surface of the wax blend. A pressure-control valve at the exit of the autoclave was then slowly closed and the pressure allowed to reach 100 psig at which point automatic pressure control commenced to maintain the autoclave at 100 psig (±2 psig).

After an hour of oxidation and every hour thereafter, a sample of product was drawn from the reactor and the acid number was determined so as to continuously measure the progression of the oxidation. When the acid number reached Ca. 15–18 mg KOH/g of sample, the air flow was interrupted and the autoclave slowly depressurized to a pressure of 'zero' gauge. The product was discharged from the reactor and then analyzed for physical properties.

The properties of this product are shown below as Sample A. The figures in parenthesis are the properties of the initial blend. Additional co-oxidized blends were prepared in a similar manner and were designated Sample B and Sample C in the Table below.

| FEEDSTOCK COMPO-SITION | A-CID # | VISCOSITY CPS @ 140° C. | HARDNESS dmm @ 25° C. | DROP PT. ° C. |
|---|---|---|---|---|
| A. 50/50-617/1702 | 15.4 | 75(**97) | 28(19) | 96.2 (97.1) |
| B. 50/50-617/ MARCUS 300 | 16.3 | 51(69) | 6.0(3.3) | 109.5 (119.1) |
| C. 50/50-617/ASTOR OK 6959 | 16.6 | 18(27) | 14(6.8) | 86.9 (88.4) |

**Data in parenthesis are initial feedstock properties

A-C 617 is a low density PE wax with medium to high branching and crystallinity.

A-C 1702 is a totally amorphous low density PE wax of very low molecular weight. It is highly branched.

Marcus 300 is a high density very crystalline low viscosity PE wax with a high melting point.

Astor OK 6959 is a high melting paraffin wax without BHT antioxidant.

EXAMPLE 2

Emulsification of Co-Oxidized Waxes

In this example, the co-oxidized wax blend of Example 1 was incorporated into an emulsion suitable for external application to the metal plates of a oriented strand board molding press. See Table below. Four hundred grams of the co-oxidized wax of Example 1 were charged o a pressure vessel equipped with an agitator along with 100 grams of an ethoxylated fatty alcohol (9EO), 5g of potassium hydroxide, 4 grams of sodium meta-bisulfite and 1150 grams of water. The pressure vessel was sealed and then heated to an internal temperature of 125° C. at which point the mixture was rapidly agitated for 15 minutes while the temperature was maintained at 125° C. The pressure vessel was then rapidly cooled to room temperature. A clear emulsion with a solids content of about 30% resulted.

| NONIONIC EMULSION | | |
|---|---|---|
| Formulation | Parts by Weight | Percent |
| Sample A | 40 | 24 |
| Marlipal 013.90 | 10 | 6 |
| KOH (90%) | 0.6 | 0.36 |
| $Na_2S_2O_5$ | 0.4 | 0.24 |
| Water | 115 | 69.4 |
| Total | 166 | 100 |

What is claimed is:

1. A wax-based release agent, comprising a co-oxidized blend of a first wax and a second wax, wherein said first wax has a Brookfield viscosity which is from about 180 to about 400 mPas at 140° C. and said second wax has a Brookfield viscosity which is less than about 100 mPas at 140° C.

2. The wax-based release agent of claim 1, wherein said first wax has a Brookfield viscosity of from about 180 to about 400 mPas at 140° C. and said second wax has a Brookfield viscosity which is less than about 60 mPas at 140° C.

3. The wax-based release agent of claim 2, wherein said first wax has a Brookfield viscosity which is from about 180 to about 400 mPas at 140° C. and said second wax has a Brookfield viscosity of about 50 mPas at 140° C.

4. The wax-based release agent of claim 1, wherein said co-oxidized blend comprises from about 20 to about 80 wt % of said first wax and from about 80 to about 20 wt % of said second wax.

5. The wax-based release agent of claim 4, wherein said co-oxidized blend comprises from about 30 to about 70 wt % of said first wax and from about 70 to about 30 wt % of said second wax.

6. The wax-based release agent of claim 5, wherein said co-oxidized blend comprises about 50 wt % of said first wax and about 50 wt % of said second wax.

7. The wax-based release agent of claim 1, wherein said co-oxidized blend of said waxes has a viscosity of from about 5 to about 100 mPas at 140° C.

8. The wax-based release agent of claim 7, wherein said co-oxidized blend of said waxes has a viscosity of from about 20 to about 60 mPas at 140° C.

9. The wax-based release agent of claim 1, wherein said co-oxidized blend of said waxes has a hardness of from about 0.1 to about 100 decimillimeters (dmm) at 25° C.

10. The wax-based release agent of claim 9, wherein said co-oxidized blend of said waxes has a hardness of from about 0.1 to about 10 decimillimeters (dmm) at 25° C.

11. The wax-based release agent of claim 1, wherein said co-oxidized blend has a drop point of from about 80 to about 120° C.

12. The wax-based release agent of claim 1, wherein said co-oxidized blend has an acid number of from about 5 to about 50.

13. The wax-based release agent of claim 1, wherein said co-oxidized blend has an acid number of from about 5 to about 18.

14. An emulsion comprising a co-oxidized blend of a first wax and a second wax, wherein said first wax has a Brookfield viscosity which is from about 180 to about 400 mPas at 140° C. and said second wax has a Brookfield viscosity which is less than about 100 mPas at 140° C.

15. The emulsion of claim 14, wherein said emulsion comprises from about 1 to about 40% by weight total solids.

16. The emulsion of claim 14, wherein said emulsion comprises a surfactant in an amount of from about 1 to about 10% by weight.

17. The emulsion of claim 14, wherein said emulsion comprises a member of the group consisting of anti-foam agents, biocides, flame retardants, lignocellulosic preservatives, fungicides and mixtures thereof.

* * * * *